J. A. WOODBURY.

Improvement in Car Wheels.

No. 4,760. Reissued Feb. 13, 1872.

Witnesses. { Charles E. Foster
A. C. Norris

Jas. A. Woodbury
By his Attys
Hinson & Lee

2 Sheets--Sheet 2.

J. A. WOODBURY.

Improvement in Car Wheels.

No. 4,760. Reissued Feb. 13, 1872.

Witnesses { Charles E. Foster / A. C. Norris

Jas. A. Woodbury / By his Atty / Howard Ely

BEST AVAILABLE COPY 4,760

UNITED STATES PATENT OFFICE.

SOLOMON P. SMITH, OF TROY, NEW YORK, ASSIGNOR, BY MESNE ASSIGNMENTS, TO JAMES A. WOODBURY, OF BOSTON, MASSACHUSETTS.

IMPROVEMENT IN CAR-WHEELS.

Specification forming part of Letters Patent No. 28,512, dated May 29, 1860; reissue No. 4,760, dated February 13, 1872.

DIVISION A.

Specification describing certain Improvements in Car-Wheels, invented by SOLOMON P. SMITH, of Troy, county of Rensselaer, State of New York.

This invention relates to car-wheels, in which the tire or rim is separated from the body of the wheel by an intervening elastic medium; and the improvements consist, firstly, of a condensed packing confined between parallel cylindrical faces of the rim and body; secondly, of a body in two sections, each having a bearing for the rim; thirdly, of a rib arranged on the tire so as to strengthen the same, and insure the retention of the tire to the body in case of fracture; fourthly, of a metallic strip combined with the packing so as to facilitate its insertion in its place and prevent injury to the same; fifthly, in compressing the packing on its seat on the body of the wheel before applying the rim; and, sixthly, of devices whereby the fastening devices which secure together the parts of the wheel are prevented from becoming loose.

Figure 1:
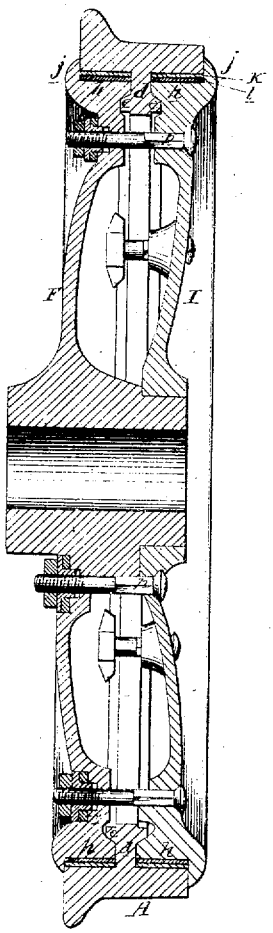
Figure 5:
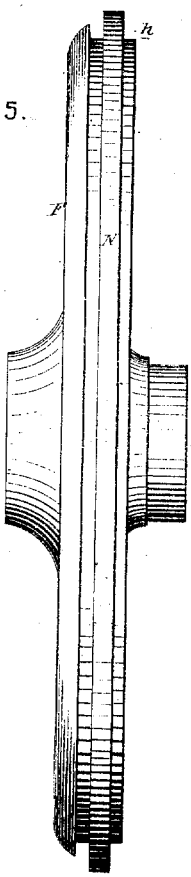
Figure 4:
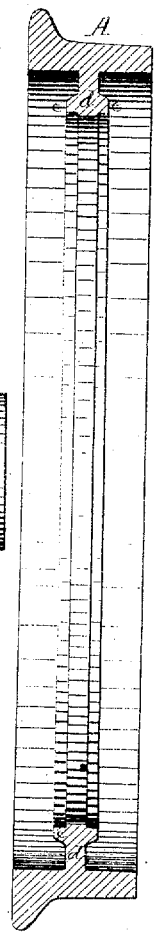
Figure 2:
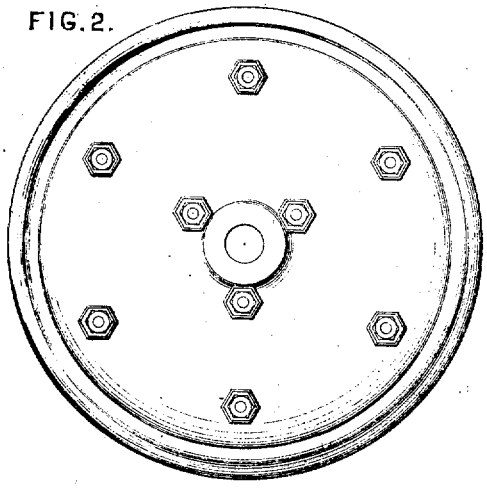
Figure 3:
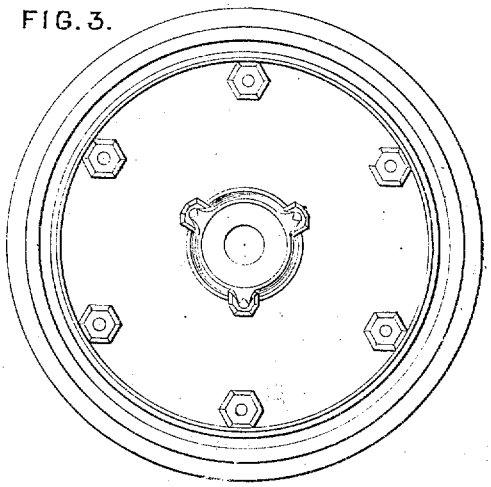
Figure 6:
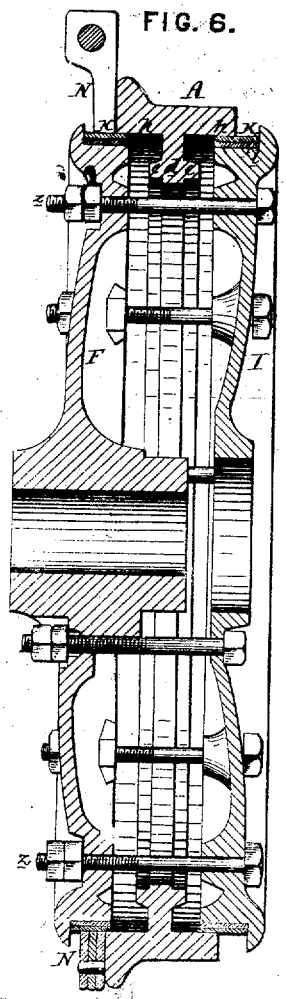
Figure 8:
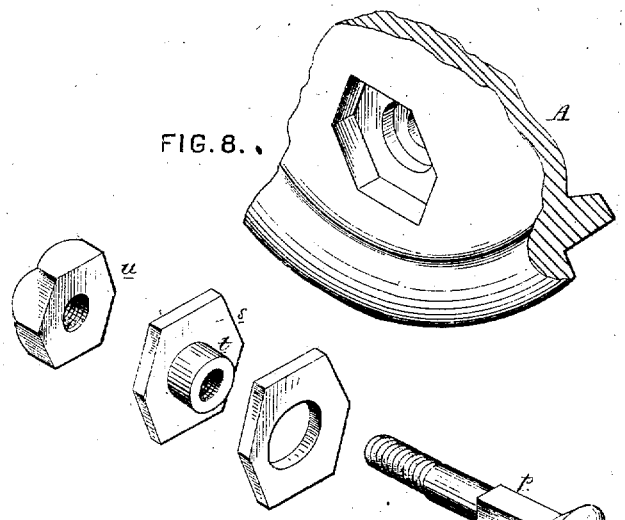
Figure 9:
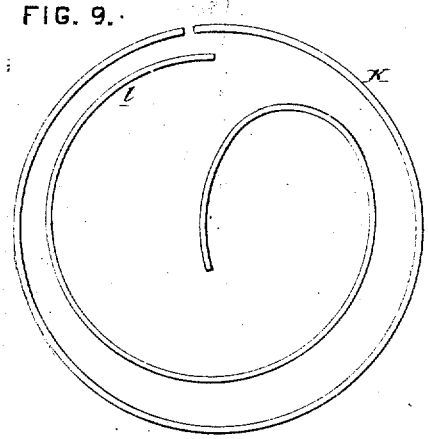
Figure 7:
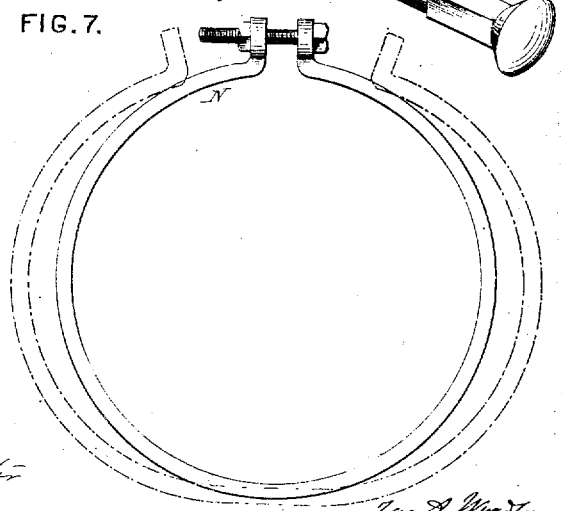

In the accompanying drawing, Figure 1, Sheet 1, is a transverse section of the improved car-wheel. Fig. 2 represents the front face of the same; Fig. 3, the rear face. Fig. 4 is a sectional view of the tire or rim; Fig. 5, a view showing parts of the wheel; Fig. 6, Sheet 2, a sectional view illustrating the manner of putting the parts of the wheel together. Fig. 7 illustrates a device used in fitting the parts of the wheel together. Fig. 8 represents a fastening device for securing the parts of the wheel together; and Fig. 9, parts of the wheel detached.

The body or center of the wheel may vary in form, but must consist of two sections, F and I, each having at the outer edge or periphery a flange, *j*, and a cylindrical shoulder, *h*, which is parallel to the inner face of a rim or tire, A, from which projects a central rib, *d*, extending inward between the sections F and I; and in each of the latter is an annular recess for the reception of a projection, *e*, on the said rib. Between the rim and the body of the wheel intervenes a compressed elastic medium, consisting of bands *l l*, of rubber or other elastic material, encircling the peripheries of the sections F and I, and inclosed by a metallic band or strip, K. The two sections F and I, composing the body or center of the wheel, may each be fitted directly to the axle, or one section may be fitted to the other, as shown in the drawing; and the two sections are secured together, so as to confine the rim *d*, by bolts *p*, arranged in two series at different distances from the hub. The elastic medium, which isolates the rim from the body of the wheel, prevents the transmission of vibrations to the latter; but in order to effectually attain this result, it is all important that the packing shall be in such a compressed state as to prevent any play of the tire under the ordinary strain to which the wheel is subjected; otherwise the packing would soon be torn, and its efficiency destroyed and the tire, being improperly backed, would yield and break. It would be difficult to insert and compress a simple fillet of rubber between the periphery of the center and the rim of the wheel, and such a fillet, even if thus inserted and compressed, would be apt to adhere to both surfaces, rendering it difficult to detach the parts of the wheel from each other; but by the application of a flexible band to the exterior of the elastic material, as described, the compression of the packing is not interfered with, its introduction is facilitated, and its adhesion to the rim prevented. The desired compression of the elastic medium is effected after the application of the same to the shoulders *h h* by means of a metallic clamp, consisting of a flexible ring, Fig. 7, the diameter of which may be contracted by means of a tangential screw. This clamp is applied to the metallic band K after the latter has been laid upon the elastic material and the screw is turned until the elastic material can be no further condensed. The section of the hub is then introduced into the rim as far as the clamp will admit, and the latter is then removed and pressure applied to force the section to its place, the metallic band *l* preventing the abrasion or displacement of the elastic material.

The rib *d* strengthens the rim, and, being enlarged toward the inner edge, is retained securely in its place if by accident it should be fractured transversely at one or more points. The double bearing for the packing on the opposite sides of the rib *d* permits the use of comparatively narrow strips of elastic material, which may be forcibly compressed and readily inserted, while the sectional body of the wheel may be more readily and perfectly cast when of cast-iron, or more economically and easily constructed when made of other materials, than if the body was in one piece.

In order that the nuts *u* of the fastening-bolts *p* may not become loosened by the jarring of the wheel, or by the expansion and contraction of the same under variations of temperature, the plate, beneath each nut and surrounding the bolt, is recessed for the reception of an elastic packing, *r*, upon which the washer *s* is forced by the turning of the nut. A sleeve, *t*, which projects from the washer and surrounds the bolt, prevents the packing from being forced against the latter, and from being cut by or adhering to the threads. The packing under pressure tends to maintain the washer in forcible contact with the nut, and thereby prevents the latter from turning.

*Claims.*

1. The introduction of a compressed annular elastic packing between cylindrical faces of the body and rim of an elastic car-wheel by first compressing the packing on the periphery of the body, substantially as described, and then adjusting the rim upon the latter.

2. The combination of the sectional body and a tire having an internal rib, *d*, extending between said sections, and having an elastic packing at each side, substantially as set forth.

3. The rim having an internal rib enlarged at or toward its inner edge, substantially as and for the purpose set forth.

4. The combination of the fastening devices confining the plates or sections and a compressed packing, *r*, operating substantially as and for the purpose set forth.

In testimony whereof I have signed my name to this specification in the presence of two subscribing witnesses.

JAMES A. WOODBURY.

Witnesses:

JAS. B. BELL,

C. C. GILBERT.